United States Patent
Varadaraj et al.

(10) Patent No.: US 12,293,215 B2
(45) Date of Patent: May 6, 2025

(54) METHODS AND APPARATUS TO PROTECT OPEN AND CLOSED OPERATING SYSTEMS

(71) Applicant: McAfee, LLC, San Jose, CA (US)

(72) Inventors: Vishnu Varadaraj, Waterloo (CA); Li Xiao, Kitchener (CA); Kathryn Young, Kitchener (CA)

(73) Assignee: McAfee, LLC, San Jose, CA (US)

( * ) Notice: Subject to any disclaimer, the term of this patent is extended or adjusted under 35 U.S.C. 154(b) by 683 days.

(21) Appl. No.: 17/478,844

(22) Filed: Sep. 17, 2021

(65) Prior Publication Data
US 2022/0075647 A1    Mar. 10, 2022

Related U.S. Application Data

(63) Continuation of application No. 16/367,210, filed on Mar. 27, 2019, now Pat. No. 11,144,345.

(51) Int. Cl.
*G06F 9/48*    (2006.01)
*G06F 9/54*    (2006.01)

(52) U.S. Cl.
CPC ............ *G06F 9/4843* (2013.01); *G06F 9/541* (2013.01); *G06F 9/542* (2013.01); *G06F 9/545* (2013.01)

(58) Field of Classification Search
CPC ........ G06F 9/4843; G06F 9/541; G06F 9/542; G06F 9/545
See application file for complete search history.

(56) References Cited

U.S. PATENT DOCUMENTS

| 1,056,376 | A | 3/1913 | Stanton |
| 7,231,637 | B1 | 6/2007 | McEwan |
| 8,234,710 | B2 * | 7/2012 | Wenzinger ............... G06F 8/62 726/22 |
| 2008/0016572 | A1 * | 1/2008 | Burkhardt .............. G06F 21/57 726/24 |
| 2008/0077943 | A1 | 3/2008 | Pierce et al. |
| 2008/0177994 | A1 * | 7/2008 | Mayer .................... G06F 16/00 709/224 |

(Continued)

FOREIGN PATENT DOCUMENTS

| WO | 2020198384 | 10/2020 |
| WO | 2020198386 | 10/2020 |

OTHER PUBLICATIONS

International Searching Authority, "International Search Report and Written Opinion," issued in connection with International Patent Application No. PCT/US2020/024758 on Jun. 25, 2020, 13 pages.

(Continued)

*Primary Examiner* — Wissam Rashid
(74) *Attorney, Agent, or Firm* — Hanley, Flight & Zimmerman, LLC

(57) ABSTRACT

Methods, apparatus, systems and articles of manufacture are disclosed. An example apparatus includes at least one memory, instructions in the apparatus, at least one processor to execute the instructions to, in response to identifying malicious data: a) in response to determining that the at least one processor is controlled by the first operating system type, block a download from being executed, and b) in response to determining a switch from the first operating system type to the second operating system type, remove, from the at least one memory, an object downloaded in the download.

20 Claims, 7 Drawing Sheets

(56) References Cited

U.S. PATENT DOCUMENTS

2010/0100591 A1     4/2010   Mahaffey et al.
2011/0209220 A1*    8/2011   Tikkanen .............. G06F 21/56
                                                        726/23
2013/0276119 A1*   10/2013   Edwards .............. G06F 21/554
                                                        726/24
2015/0277933 A1    10/2015   Hsieh et al.
2016/0283259 A1*    9/2016   Mehta ................ G06F 9/45558
2018/0365421 A9    12/2018   Surdu

OTHER PUBLICATIONS

United States Patent and Trademark Office, "Non-Final Office Action", issued in connection with U.S. Appl. No. 16/367,210 on Jan. 7, 2021, 10 pages.

United States Patent and Trademark Office, "Notice of Allowance and Fee(s) Due," issued in connection with U.S. Appl. No. 16/367,210 on Jun. 11, 2021, 7 pages.

* cited by examiner

METHODS AND APPARATUS TO PROTECT OPEN AND CLOSED OPERATING SYSTEMS

RELATED APPLICATION

This patent arises from a continuation of U.S. patent application Ser. No. 16/367,210, (now U.S. Pat. No. 11,144, 345) which was filed on Mar. 27, 2019. U.S. patent application Ser. No. 16/367,210 is hereby incorporated herein by reference in its entirety. Priority to U.S. patent application Ser. No. 16/367,210 is hereby claimed.

FIELD OF THE DISCLOSURE

This disclosure relates generally to operating systems, and, more particularly, to protecting closed and open operating systems.

BACKGROUND

An operating system (OS) is software that allows a user to execute applications on a computing device. As used herein, an application is software designed to perform a group of functions, tasks, or activities for the benefit of a user. The OS manages a computer's hardware resources including input devices such as a keyboard and mouse, output devices such as display monitors, printers, and scanners, network devices such as modems, routers, and network connections, and storage devices such as internal and external drives.

Figure 1:
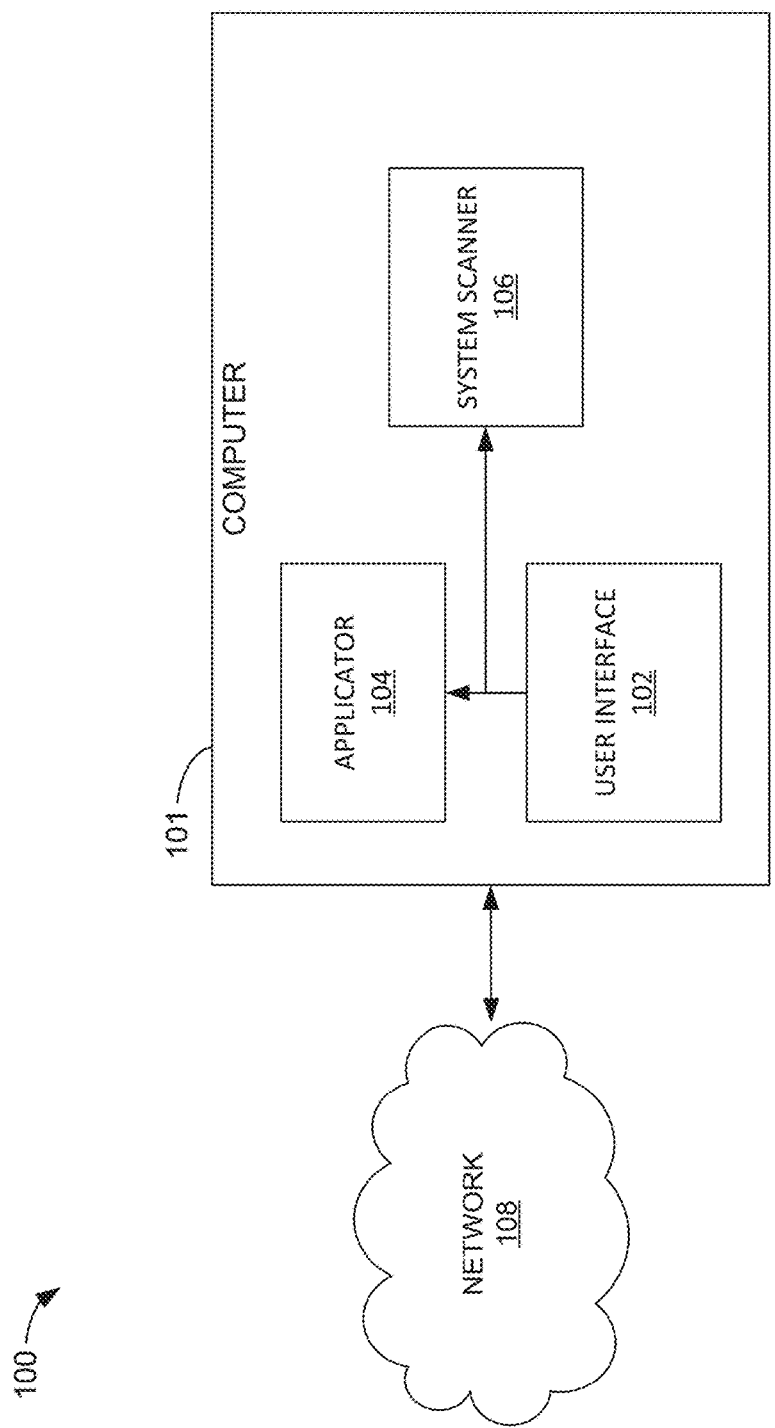
FIG. 1 is a block diagram of a computing environment in which an example system scanner operates.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Traditionally, software security for operating systems is developed to protect a user and their machine hardware from disclosure, alteration, destructions, and a plurality of other threats. As technology is evolving, it has become more difficult to provide complete protection to the users and machines. In the technology space of operating systems, there are generally two approaches of managing applications that the user can install and run which are known as open and closed. In an open operating system, the user can install and run applications from a plurality of distribution channels without involvement from operating system vendors. For example, if the user uses an open operating system, they can create their own application, download a previously created application using a web browser, or install from a removable media and would not need to go through a controlled environment such as an App Store or restricted application distributor.

Applications running on open operating systems typically have access to all or most of the operating system resources and functionalities. On open operating systems, applications can install kernel modules to interact with operating system kernel components at a low level (e.g., little or no abstraction between the programming language and machine language) to achieve the desired functionality. A kernel is the core computer program of the operating system and performs tasks such as executing processes, managing hardware devices, and handling interrupts. In some examples, security software developed for open operating systems have a kernel module(s) and use low-level application programming interface(s) (API) to help defend the operating system from threats in a digital world. Example open operating systems include, Microsoft®, Windows® desktop operating system, Linux®, and Apple Mac® OS X.

In closed operating systems, the environment limits the operations available to users. For example, the closed operating system may only allow applications approved by the operating system vendor to be installed. For example, a closed operating system may only allow applications to be retrieved and installed from an App Store. In some examples of closed operating systems, installed applications operate in a sandbox, have limited access to files or storage, are not allowed to install kernel modules, and/or use low-level APIs. On some closed operating systems, applications are restricted to use proprietary APIs specific for that operating system. Security software developed for closed operating systems are restricted to the above mentioned requirements. Examples of closed operating systems include, but are not limited to, Windows® RT, Windows® 10 S, and Apple® iOS.

In some examples, security software developed for an open OS does not run on a closed OS because the security software for the open OS may rely on kernel modules or low-level APIs, which are not available on the closed OS. For example, applications downloaded by a user in an open OS may be untested by the operating system vendor and are therefore at a higher risk for security threats than applications tested in the closed OS. In other examples, software security developed for open OS are not designed to use proprietary APIs required by the closed OS. On the other hand, security software developed for closed OS either may not be installable on the open OS or may not provide similar protection because such security software does not include kernel modules or uses of low-level APIs required for defending the open OS.

Examples disclosed herein provide security software capable of operating on both the closed and open OS. For example, the methods and apparatus disclosed herein provide protection for applications, files, processes, modules, etc., that have been downloaded, modified, created, etc., in either and/or both closed operating systems and open operating systems. Examples disclosed herein utilize a same set of binaries built from a source code base (e.g., a single source code base) to protect the applications, files, processes, modules, etc., of open and closed operating systems from a plurality of threats. For example, when a user installs security software implemented according to the methods and apparatus disclosed herein on the closed OS, the user may not install a second security software if they switch to the open OS because the source code base, previously compiled when on the closed OS, includes files corresponding to protection of both the open and closed OS. Further, in some such examples, because the security software components for both open and closed OSs is bundled in a single executable, installer, package, etc. a user need only install the security software implemented according to the methods and apparatus disclosed herein once, eliminating the need to reinstall security software after an OS type switch.

Examples disclosed herein detect the OS type, adapt to the most capable API available for that operating system type, and use that API to activate scanners to provide maximum protection to the user's computer. For example, methods and apparatus disclosed herein utilize a plurality of scanning engines which scan files, applications, modules, processes, computer behaviors, etc., to determine if any of the items include malicious data or potential threats to the computer. Further, when a user installs example methods and apparatus disclosed herein, some of the scanning engine files/components may not be immediately activated depending on the detected OS type. The deactivated files may become activated when necessary (e.g., a change in the OS type is detected).

Examples disclosed herein can switch API types (e.g., using a first API for open OS or a second API for closed OS) that are used based on the detection of operating system type. For example, methods and apparatus utilize a detector to detect when an operating system type switch occurs and to notify an adapter to adapt to the change and further activate the scanning engines that will be utilized to protect the user's computer.

As used herein, the term "scanning" or "scan" refers to a process in which data is inspected to determine if it is malicious, threatening, etc., to a computer's functionality. For example, threats can lead to attacks on a computer system in which the computer crashes, they can result in private data becoming public (e.g., bank account numbers, passwords, confidential information, etc.), and more.

As used herein, the term "code base" or "source code base" refers to the complete body of source code for an application or software program. For example, source code is the version of a program that a programmer writes and saves as a file, wherein the file is compiled and further run on a computer.

As used herein, the term "application programming interface" or "API" refers to a set of functions or procedures used by computer programs to access operating system services, software libraries, or other systems. An API can be implemented as a set of configuration files (e.g., Extensible Markup Language (XML) files, etc.) in which each configuration file defines one or more commands to be exposed for interaction with the applications and security scanners of the OS. While a configuration file names and defines a command and its expected input(s) and output(s) for execution by a user, application, system, etc., details of the command (e.g., operations and/or rules tying input(s) to output(s), etc.) can be hidden from an external entity such as a user, application, computing system, etc.

As used herein, the term "operating system (OS) vendor" refers to the creator and designer of the operating system type. Operating system vendors include, but are not limited to, Microsoft®, Apple®, and Linux®. Microsoft provides a variety of operating system types such as Windows® 10S, Windows® Desktop, and Windows® Server. Apple® provides operating systems such as Mac® OS X and Apple® iOS. Linux® provides operating systems such as Linux® Mint and Ubuntu.

As used herein, the term "application" refers to a set of rules and instructions written to fulfill a particular purpose. Examples of applications include communication portals (e.g., Skype for Business, Webex™, iMessage, etc.), writing and drawing programs (e.g., Microsoft Word, Photoshop Editor, etc.), games, mathematical programs (e.g., online calculator), business related applications (e.g., Office Suite, Slack, etc.), security applications, web browsers (e.g., Microsoft Edge, Google Chrome, Internet Explorer, etc.), and social media applications (e.g., Facebook, Twitter, Snapchat, etc.).

FIG. 1 is a computing environment 100 in which methods and apparatus disclosed herein are utilized. The computing environment 100 includes an example computer 101 to be protected from software and hardware threats. The example computer 101 is a device that can be used to store, communicate, and process data. The example computer 101 includes a connection to an example user interface 102, an example applicator 104, an example system scanner 106, and an example network 108.

In FIG. 1, the example computer 101 includes the example user interface 102 to allow a user to interact with and control the operations and processes of the computer. The example user interface 102 also allows a user to change and/or update files, download and install applications or security software, create programs, change operating systems (e.g., from open to closed) and initiate computer inspection (e.g., scanning programs, applications, files, etc.). In some examples, when the user interface 102 initiates any of the above processes, it will provide a notification to the example applicator 104 to apply the instructions. The example user interface 102 may be implemented by a computer monitor, an LCD touch display screen, a Graphical User Interface (GUI), etc. In some examples, the user interface 102 has a different appearance in a first type of operating system (e.g., open OS) than in a second type of operating system (e.g., closed OS).

Figure 6:
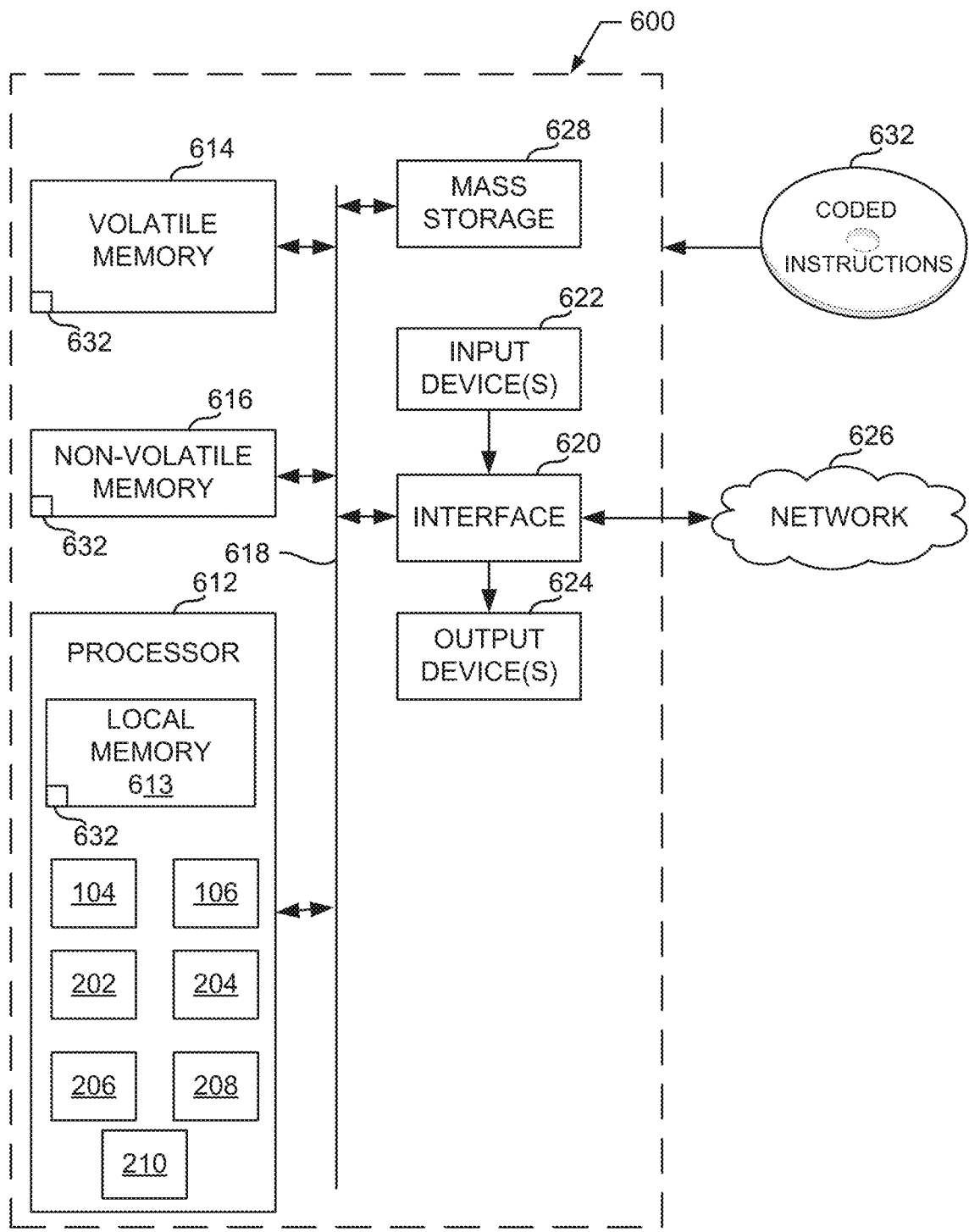
FIG. 6 is a block diagram of an example processing platform structured to execute the instructions of FIG. 3 to implement the system scanner of FIGS. 1 and 2.

In FIG. 1, the example computer 101 includes the example applicator 104 to apply instructions received from the example user interface 102 to be executed by a processor, such as the example processor 612 illustrated in FIG. 6. In some examples, the applicator 104 is an installation device to install downloaded processes and applications to be run on the computer 101. For example, the applicator 104 may install security software (e.g., the system scanner 106) on the computer 101 to protect the downloaded processes and applications from threats. In other examples, the user interface 102 instructs the applicator 104 to switch the OS types and the applicator initiates a process that activates the correct applications and programs to switch from a first OS type to a second OS type.

In FIG. 1, the example computer 101 is communicatively coupled to the example network 108 for access to the Internet, other computers, etc. The example network 108 may provide various distribution channels to the user such as Internet channels (e.g., Chrome™ browser, Microsoft Edge, Internet Explorer®, Mozilla Firefox™, etc.) and Store Apps (e.g., Microsoft® Store, App Store®, etc.).

In FIG. 1, the example computer 101 includes the system scanner 106 to provide scanning and protection capabilities to both closed OS types and open OS types and detect changes, updates, installations, downloads, etc. that occur on the computer 101. For example, the system scanner 106 intercepts notifications provided by the user interface 102 and/or the applicator 104, by monitoring packets of information travelling between the two, to determine when parts of the computer programs should be scanned. The example system scanner 106 may have access to all files, applications, running programs, etc., that are stored in a datastore, such as the mass storage 628 of FIG. 6, of the example computer 101. For example, to protect the computer 101 from threats, the system scanner 106 accesses the files, programs, and applications to scan and remove corrupt or malicious objects. An example implementation of the system scanner 106 is described in connection with FIG. 2.

Figure 2:
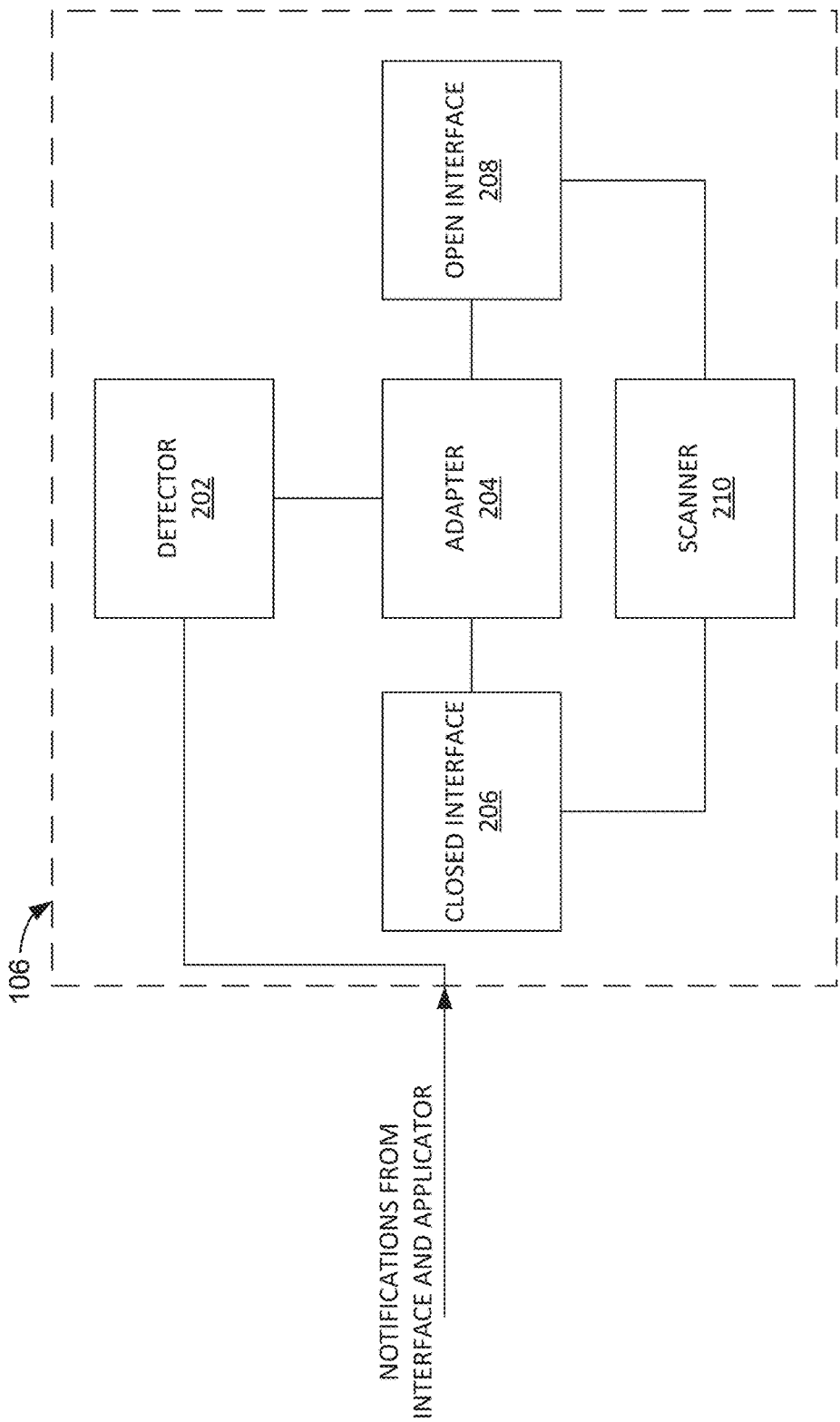
FIG. 2 is a block diagram of an example implementation of the system scanner of FIG. 1 to provide protection capabilities to closed and open operating systems.

FIG. 2 is a block diagram of an example implementation of the system scanner 106 of FIG. 1 to protect the example computer 101 from potential and/or real-time software and/or hardware threats. The example system scanner 106 of FIG. 2 includes an example detector 202, an example adapter 204, an example closed interface 206, an example open interface 208, and an example scanner 210.

In FIG. 2, the example system scanner 106 includes the example detector 202 to dynamically detect the switching of an OS from a first type (e.g., closed) to a second type (e.g., open) while also detecting application and file updates and modifications, new processes created, and new application installations. The example detector 202 is arranged to receive notifications from the example user interface 102 and the example applicator 104. For example, the provider of the OS and/or computer 101 (e.g., Microsoft, Apple, Dell, HP, etc.) may provide the user the option to switch from closed OS to open OS or from open OS to closed OS via the user interface 102. For example, Microsoft® may provide a user operating the computer 101 in closed OS mode (e.g., Windows 10S) the option to switch to open mode (e.g., Windows 10 Pro or Windows 10 Home) by interacting with buttons on the user interface 102. Further, when these buttons on the user interface 102 have been interacted with, the switch from one type to another is initiated, and a notification may be provided to the applicator 104 to inform it to apply the instructions of the switch. In some examples, the detector 202 accesses an API that is provided in the OS type and is arranged to receive notifications when a user switches OS types. The example detector 202 is arranged to receive the notifications from the API when the example system scanner 106 is installed on the example computer 101 by the user or the provider.

The example detector 202 is also arranged to detect other changes to the example computer 101 such as file modifications, new downloads, updates to applications, etc. For example, the user may be browsing the Internet via the user interface 102 for games to play and may come across a website where the user can download games to the computer 101. Further, when the user interface 102 provides a notification to the applicator 104 to download the game, the detector 202 may also receive that notification and determine that a new download is being applied to the computer 101. In response to such notifications, the example detector 202 may direct the example system scanner 106 to scan for new threats because such new downloads, file modifications, application updates, etc., may include harmful data that can attack the computer 101.

In FIG. 2, the example system scanner 106 includes the example adapter 204 to adapt the system scanner 106 to the OS (e.g., leverage the API corresponding to the OS type) when the example detector 202 determines a switch has occurred. As used herein, the term leverage refers to improving the advantages of the example system scanner 106 by determining which interface (e.g., closed interface 206 or open interface 208) of the OS type will provide access to the pertinent scanning capabilities. For example, in an open OS mode, there may be a plurality of open mode APIs used, and the adapter 204 determines which open mode API (e.g., open interface 206) provides access to the most files, applications, programs, etc. The example adapter 204 receives a notification from the example detector 202 with information corresponding to the switch in OS types. In some examples, the adapter 204 also receives information from the detector 202 corresponding to changes, updates, and modifications of the computer 101. For example, the detector 202 may notify the adapter 204 corresponding to a modification to a file and the adapter 204 leverages the correct interface (e.g., closed interface 206 or open interface 208) to scan the file. In some examples, the adapter 204 is a communication bridge that allows the two interfaces 206, 208 to be compatible with one another and the scanner 210.

In FIG. 2, the example system scanner 106 includes the example closed interface 206 to provide access to limited applications, files, storage, and scanning capabilities to the user. In some examples, the closed interface 206 accesses a closed mode API that provides applications via the OS vendor's "store" and runs in sandbox. As used herein, the term sandbox refers to a testing environment in which code may be executed and files may be accessed while being isolated from other system components and files, which results in protecting data located in computing devices from changes that could be damaging. For example, the closed interface 206 may access Universal Windows Platform (UWP) API that is installed on Microsoft's Windows 10S mode (e.g., closed OS). UWP API provides the user with applications that can be used across a plurality of Microsoft-based devices (e.g., tablets, laptops, smartphones, Xbox One, IoT, etc.) but only allows the user access to the applications listed in the UWP Windows App Store. The applications included in the Windows App Store are restricted to specific requirements determined and set by Microsoft. By way of these restrictions, the example closed interface 206 provides the example computer 101 with less safety risks than examples discussed below in connection with the example open interface 208.

In some examples, if the user receives the computer 101 from a provider that has preinstalled the OS, in which the OS is a closed type, and preinstalled the system scanner 106, then the system scanner 106 provides the computer 101 with both interfaces 206, 208, but only the closed interface 206 is active and the open interface 208 is inactive. Further, when the example detector 202 determines an update or change to the example computer 101 and notifies the example adapter 204, the example adapter 204 activates the components of the example closed interface 206 to access the pertinent scanners of the example scanner 210 to scan the applications and/or files that were modified. For the example closed interface 206, the scanners only operate in the listed applications provided by the closed mode OS vendor.

In FIG. 2, the example system scanner 106 includes the example open interface 208 to access a plurality of applications and programs and further activate the scanners of the example scanner 210. In some examples, the open interface 208 accesses an open mode API that provides the computer 101 with access to a plurality of applications from a plurality of devices, channels, etc. without involvement from the OS provider. For example, applications accessible by the open interface 208 have access to all of the open OS resources and functionalities, not just the ones specified by the OS vendor. In some examples, the applications provided by the open interface 208 run at low level programming (e.g., to directly access hardware, the OS kernel, etc.) In this manner, the scanners of the example scanner 210 may be similar to the low level programming applications in order to intentionally protect the example computer 101 from threats in the computing environment 100.

In FIG. 2, the example system scanner 106 includes the example scanner 210 to inspect components within the OS including applications, files, processes, etc., and perform an action when harmful data is found. For example, the scanner 210 may scan a file that has been modified and detect that the file includes a "virus" (e.g., a small program or script that can negatively affect the health of the computer 101) and further determines to remove the file from the computer 101 OS. In some examples, the scanner 210 includes a plurality of scanning engines designed for a specific purpose. For example, a first scanning engine may be an anti-virus engine that scans files as discussed above. A second scanning engine may be an anti-spyware engine that scans incoming network data, downloaded files, etc., to determine if the files are capturing web-browsing habits, email messages, user names and passwords, and credit card information from the computer 101 and further block and remove those files. Spyware refers to a program that "spies" on the computer 101 and gathers personal information about the user. In some examples, the scanner 210 includes a plurality of scanning types to protect the computer 101 and is not limited to the scanning engines discussed above.

The example scanner 210 utilizes existing binaries of the closed OS and the open OS to scan the files and applications of the example computer 101. For example, the scanner 210 may receive notifications from kernel mode drivers, OS vendor application stores, etc., to determine when a computer 101 component should be scanned.

The example scanner 210 includes a database or a plurality of databases that the scanning engines reference when scanning the files and components of the computer 101. For example, the second scanning engine designed to protect the computer 101 from spyware may include a database including signatures (e.g., a sequence of bits) that resemble examples of spyware and the scanning engine compares the incoming network data and files of the computer 101 to the stored signatures as a means of detecting. The database of the example scanner 210 is accessible by the system scanner 106 provider and is periodically updated when the provider determines the signatures representing the virus have been modified and/or added on to. In this manner, the database is kept up-to-date and provides protection for the computer 101.

In some examples, the scanner 210 includes scanning engines specific to the OS type of the computer 101. For example, when the computer 101 is operating in open OS, the adapter 204 communicates via the open interface 208 to activate the scanners for the open OS applications. Further, the scanning engines of the example scanner 210 that correspond to open OS components are arranged to utilize the kernel mode driver that notifies the scanner 210 regarding notifications, updates, modifications, etc. For example, when the user executes an event such as clicking on an internet link, downloading an application, or saving a document, the kernel mode driver will intercept the event and pass it up to the scanner 210, before the computer 101 allows the event to occur. In this manner, if the scanner 210 determines the event is a virus, it will block the event from occurring and notify the user via the user interface 102. If the example scanner 210 does not identify a virus in the event, it will allow the open interface 208 to execute the event and notify the user, via the user interface 102, that the event was executed.

In some examples, the scanner 210 includes scanning engines specific for a closed mode OS. For example, when the computer 101 is operating in closed mode OS, the adapter 204 communicates via the closed interface 206 to activate the scanning engines specific to the closed OS applications. Further, the scanning engines corresponding to the closed OS components are arranged to have access to the applications provided by the OS vendor. The closed mode scanning engines of the example scanner 210 do not need to operate (e.g., scan) for kernel mode drivers and kernel components as well as web browsers and scripting engines (e.g., programming language with a series of commands within a file that are capable of being executed without being compiled) when the OS vendor does not verify them and therefore the closed OS does not include such components. Further, the user is prohibited access from applications, programs, browsers, files, etc., not provided by the vendor. In this manner, the applications, programs, browsers, files, etc., are tested by the OS vendor and therefore less likely to include viruses unlike open OS applications, browsers, programs, files, etc., in which not all of them are tested by the OS vendor because the user has a wider range of access and "freedom."

In some examples, the scanner 210 includes scanning engines that operate in both closed OS mode and open OS mode. For example, an anti-virus scanning engine operates (e.g., performs scanning functions) on all applications recently downloaded by the computer 101. The same scanning engine utilized for the closed OS vendor-provided applications also can be utilized for open OS applications. For example, regardless of what OS type the system scanner 106 is operating on, it will use the same set of scanning engines of the scanner 210.

While an example manner of implementing the system scanner 106 of FIG. 1 is illustrated in FIG. 2, one or more of the elements, processes and/or devices illustrated in FIG. 2 may be combined, divided, re-arranged, omitted, eliminated and/or implemented in any other way. Further, the example detector 202, the example adapter 204, the example closed interface 206, the example open interface 208, the example scanner 210 and/or, more generally, the example system scanner 106 of FIG. 1 may be implemented by hardware, software, firmware and/or any combination of hardware, software and/or firmware. Thus, for example, any of the example detector 202, the example adapter 204, the example closed interface 206, the example open interface 208, the example scanner 210 and/or, more generally, the example system scanner 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example detector 202, the example adapter 204, the example closed interface 206, the example open interface 208, and/or the example scanner 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system scanner 106 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the system scanner 106 of FIGS. 1 and 2 is shown in FIGS. 3, 4, 5A, and 5B. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 3, 4, 5A, and 5B, many other methods of implementing the example system scanner 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3, 4, 5A, and 5B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
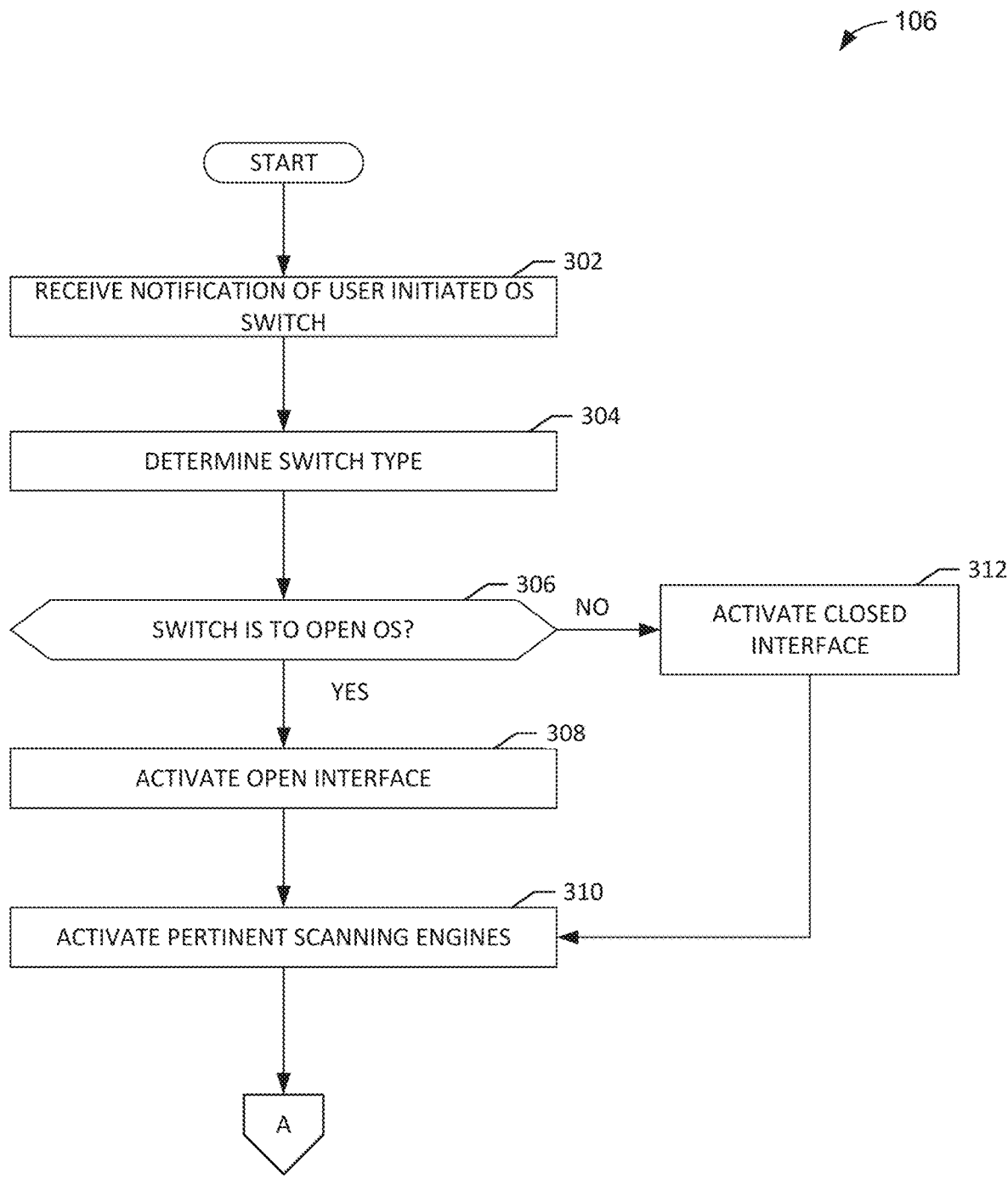
FIG. 3 is a flowchart representative of example machine readable instructions which may be executed to implement the system scanner of FIGS. 1 and 2 to determine an operating system switch.

The initiate scanning program of FIG. 3 begins at block 302 when the example detector 202 (FIG. 2) receives a notification of a user-initiated OS switch. For example, the detector 202 is arranged to intercept and/or receive notifications from the example user interface 102 and the example applicator 104 when the user has requested to switch from an open OS to a closed OS or a closed OS to an open OS. The example detector 202 then determines the switch type (block 304). For example, the detector 202 receives the notification from the user interface 102 and analyzes the notification to determine what the user has requested from the computer 101.

The example detector 202 determines if the switch is to open OS (block 306). For example, the detector 202 determines if the user is switching to an open OS by querying the user interface 102 and/or the applicator 104 to determine what OS either are running on. In some examples, the detector 202 can determine what OS the computer 101 is running on by checking the metadata of the GUI of the user interface 102 because the GUI may be different for a closed OS than an open OS such as the color, the application icons, etc. In other examples, the detector 202 queries information in the computer 101 registry to determine what OS the computer 101 is running on. If the example detector 202 determines that the example computer 101 is running on a closed OS, then it can further determine that the switch is to open OS (block 306). The example adapter 204 then activates the open interface 208 (block 308). For example, if the detector 202 determines the switch is to open OS (block 306), then it notifies the adapter 204 about the update, and the adapter 204 further provides activation notifications to the open interface 208 such as a request to install kernel mode driver components.

When the example adapter 204 activates the open interface 208 (block 308), the open interface 208 further activates the pertinent scanning engines (block 310) of the example scanner 210. For example, the open interface 208 activates the open OS mode scanning engines such as the engines that scan the kernel mode driver components.

If at block 306, the example detector 202 determines the switch is not to open OS, then it notifies the example adapter 204. The example adapter 204 activates the example closed interface 206 (block 312). For example, the adapter 204 provides activation notifications to the closed interface 206 (block 312) that initiate the installation of the components of the closed OS. After the example closed interface 206 is fully operational, it activates the pertinent scanning engines (block 310) of the example scanner 210.

Figure 4:
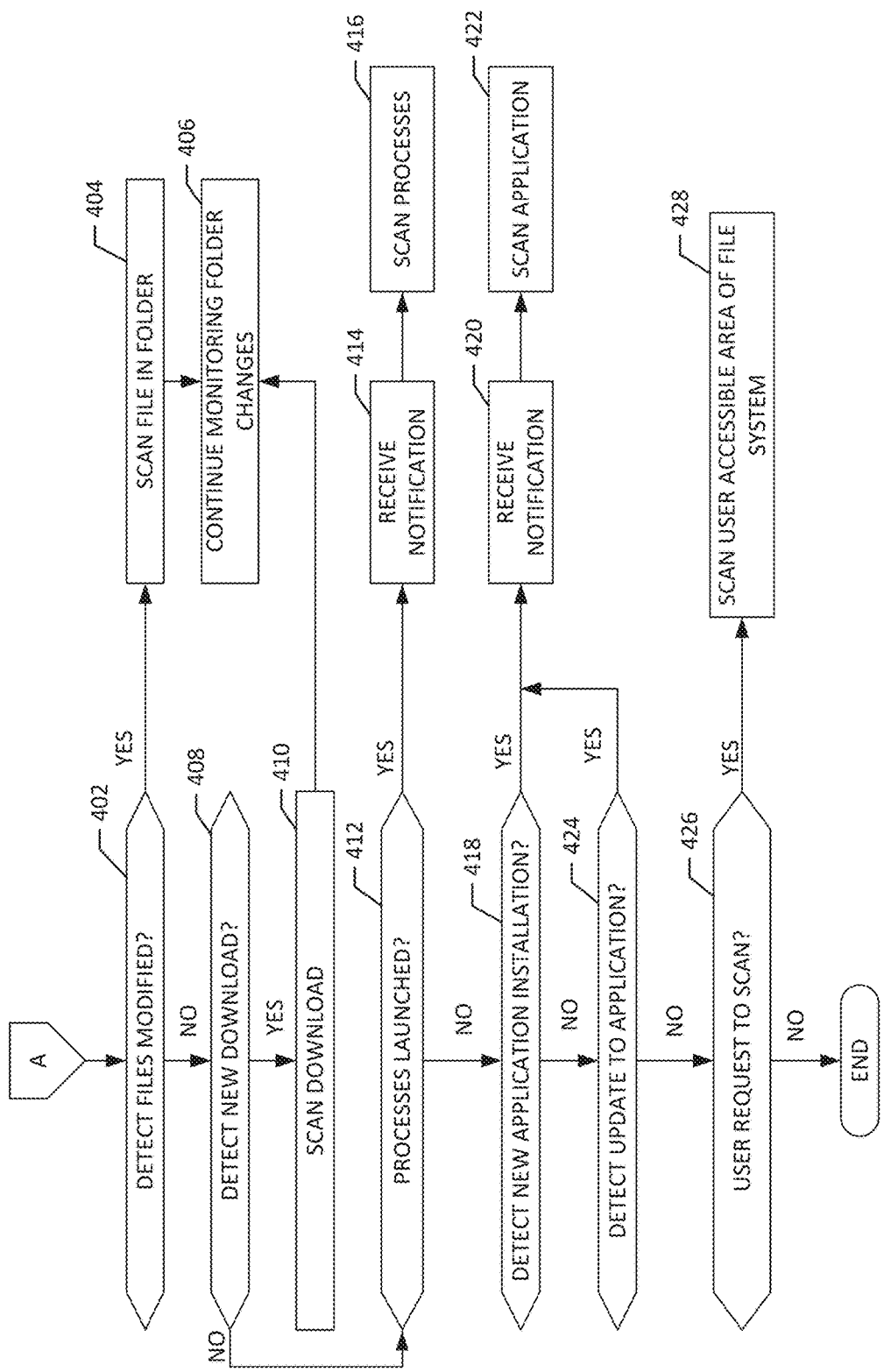
FIGS. 4, 5A, and 5B are flowcharts representative of machine readable instructions which may be executed to implement the scanning capabilities of the system scanner of FIGS. 1 and/or 2.
Figure 5A:
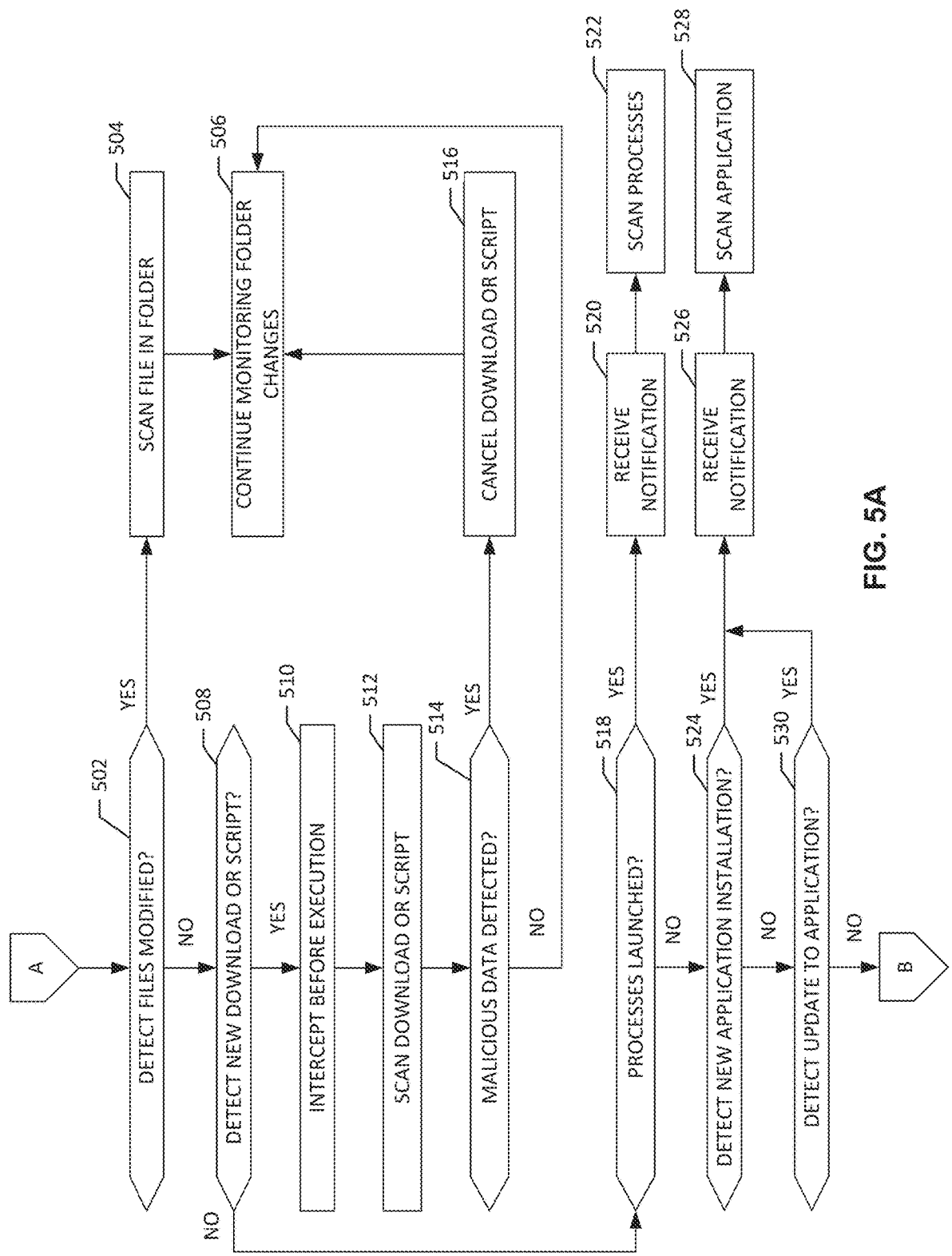

After the pertinent scanning engines have been activated by the example open interface 208 or the example closed interface 206 (e.g., after block 308 or block 312) control moves to the process illustrated by FIGS. 4, 5A, and/or 5B to begin scanning.

Turning to FIG. 4, the scanning program of the example closed OS mode begins at block 402 when the example detector 202 detects if a file was modified. For example, the scanner 210 may be arranged to monitor the folders (e.g., a storage space where a plurality of files can be stored and organized) of the computer 101 and may receive notifications when a file has been changed and/or updated. If the example scanner 210 detects a file was modified (block 402), the example scanner 210 scans the file in the folder (block 404). For example, the scanning engines of the scanner 210 may scan the file for malware, virus, worms, etc. The example scanner 210 continues to monitor folder changes (block 406) after it has scanned the file. In some examples, the scanner may perform an action on the file if it detects harmful data in the file.

If the example scanner 210 does not detect files modified (block 402), it detects if there is a new download (block 408). For example, the detector 202 may receive a notification from the applicator 104 that it has installed and/or downloaded a new application. In other examples, the scanner 210 may notice a new download received in the folder while it is monitoring the folder. If the example scanner 210 or the example detector 202 detects a new download (block 408), then the scanning engines scan the download (block 410) for harmful data. In some examples, the scanning engines scan the download after it has been downloaded by the applicator 104, and further perform an action to remove the downloaded file if harmful data has been detected in the scan. The example scanner 210 further continues to monitor folder changes (block 406) after it has scanned the download. If the example scanner 210 has not detected a new download (block 408), the program turns to block 412 wherein the closed interface 206 determines if a process was launched. A process is an instance of a computer program that is being executed. If the example closed interface 206 determines a new process was launched (block 412), the example scanner 210 receives a notification (block 414) indicative of a request to scan the process. The example scanning engines scan the process (block 416). For example, the notification received by the scanner 210 may indicate the type of scanning engine required for the process such as an anti-virus scan. Further, the example scanner 210 may perform an action on the processes if the scan detected harmful data.

At block 412, if the example closed interface 206 does not detect a process launched, it determines if a new application was installed (block 418). For example, the closed interface 206 may receive a notification from the detector 202 that an application was installed by the applicator 104. Further, the scanner 210 receives a notification (block 420) from the closed interface 206 to scan the application (block 422). In some examples, the scanner 210 can access the applications provided by the OS vendor and no other applications, because it is not pertinent in a closed OS. If the example closed interface 206 does not detect a new application installation (block 418), it determines if there is an update to an application (424). For example, the closed interface 206 may receive notifications from the detector 202 when it has detected that the applicator 104 has applied an update or modification to a previously installed application. Further, the scanner 210 receives a notification (block 420) to scan the application (block 422) that has been updated.

If the example closed interface 206 does not detect an update to an application (block 424), it will determine if the user requested a scan via the user interface (block 426). For example, the user interface 102 may provide the user an option to request a scanning operation on a particular file, application, or the computer 101 as a whole and when the user requests to scan (block 426), the scanner 210 receives the notification and scans the user accessible area of the file (block 428). For example, in a closed OS, applications are restricted from writing to privileged areas of a file system such as changing kernel functions or installing new software. The scanning program of the closed OS ends when there is no longer an area of the computer 101 that needs to be scanned.

Turning to FIG. 5A, the example scanning program of the example open interface 208 begins at block 502 when the example detector 202 detects if a file was modified. For example, the scanner 210 may be arranged to monitor the folders (e.g., a storage space where a plurality of files can be stored and organized) of the computer 101 and may receive notifications when a file has been changed and/or updated. If the example scanner 210 detects a file was modified (block 502), the example scanner 210 scans the file in the folder (block 504). For example, the scanning engines of the scanner 210 may scan the file for malware, virus, worms, etc. The example scanner 210 continues to monitor folder changes (block 506) after it has scanned the file. In some examples, the scanner may perform an action on the file if it detects harmful data in the file.

If the example scanner 210 does not detect files modified (block 502), it detects if there is a new download or script (block 508). For example, the detector 202 may receive a notification from the applicator 104 that a script has been applied to the computer 101 and the components (e.g., kernel mode driver) of the open interface 208 intercepts the script before it is executed (block 510). In some examples, the intercepted script or download is passed to the scanner 210 to scan the download or script (block 512). At block 514, the example scanner 210 determines if malicious data has been detected in the download or script, and if there is malicious data detected, the example scanner 210 cancels and removes the download or script (block 516) before it can be executed on the computer 101. The example scanner 210 continues to monitor folder changes (block 506) after malicious data has or has not been detected. For example, the scanner 210 may be arranged to receive notifications corresponding to the folder in which downloads and scripts are stored.

At block 508, if the example scanner 210 does not detect a new download or script, the open interface 208 determines if a process was launched. If the example open interface 208 determines a new process was launched (block 518), the example scanner 210 receives a notification (block 520) indicative of a request to scan the process. The example scanning engines scan the process (block 522). For example, the notification received by the scanner 210 may indicate the type of scanning engine required for the process such as an anti-virus scan. Further, the example scanner 210 may perform an action on the processes if the scan detected harmful data.

At block 518, if the example open interface 208 does not detect a process launched, it determines if a new application was installed (block 524). For example, the open interface 208 may receive a notification from the detector 202 that an application was installed by the applicator 104. Further, the scanner 210 receives a notification (block 526) from the open interface 208 to scan the application (block 528). In some examples, the scanner 210 can access the applications provided by the OS vendor and applications provided by various channels of media. In this manner, the scanning engines are arranged to access multiple components of the open OS in order to provide optimal protection. If the example open interface 208 does not detect a new application installation (block 524), it determines if there is an update to an application (block 530). For example, the open interface 208 may receive notifications from the detector 202 when it has detected that the applicator 104 has applied an update or modification to a previously installed application. Further, the scanner 210 receives a notification (block 526) to scan the application (block 528) that has been updated. The example scanner 210 may not detect an update or new installation to an application, and the scanning program continues to FIG. 5B.

Figure 5B:
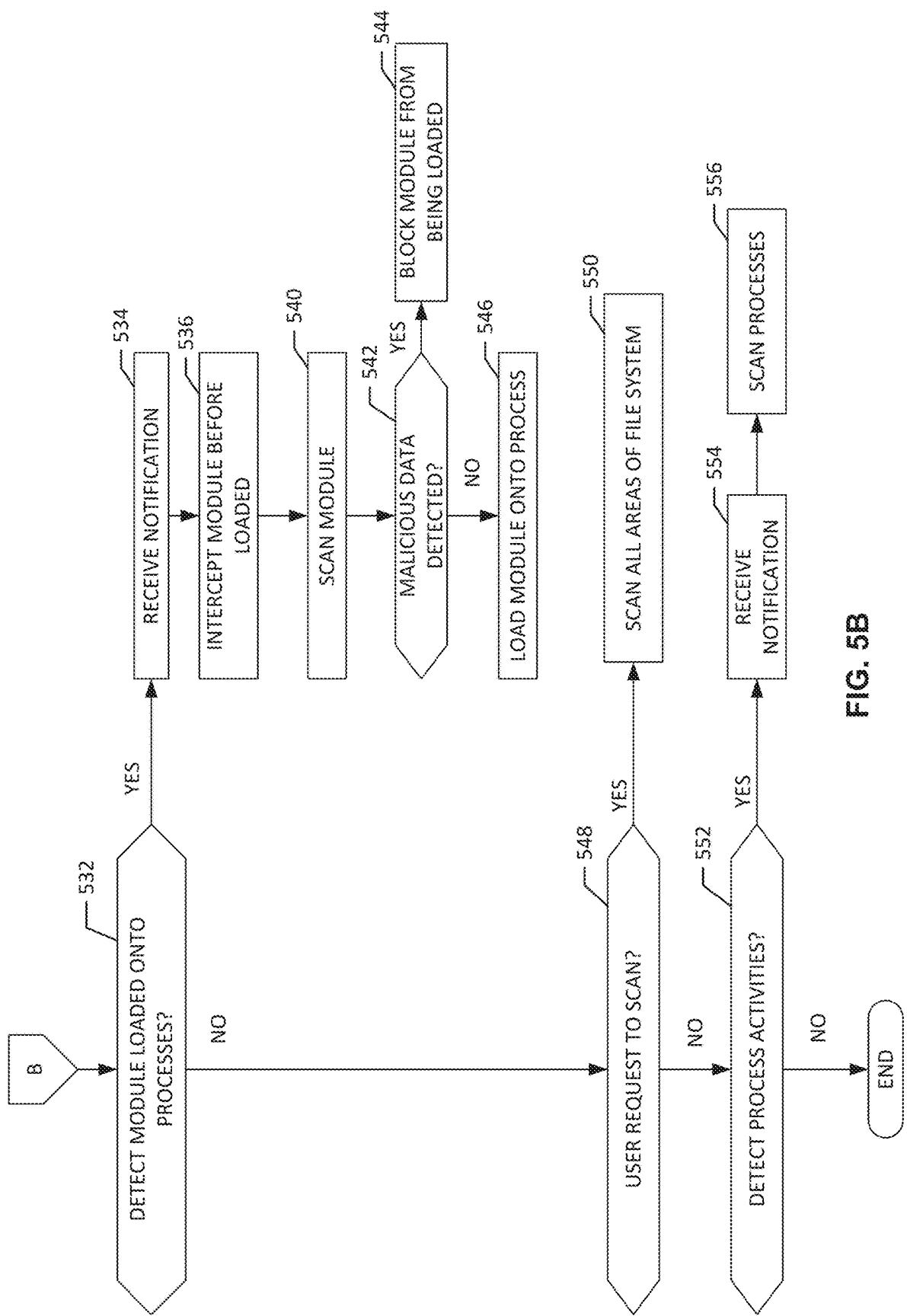

Turning to FIG. 5B, the example scanning program of the open OS continues to block 532 when the example open interface detects a module (e.g., a file included in a process that is executable) loaded onto a process. For example, the open interface 208 may be arranged to receive notifications from kernel mode driver when a new module is going to be loaded. When the example open interface 208 receives the notification (block 534) from the kernel mode driver, it intercepts the module before it is loaded (block 536) and provides it to the example scanner 210 to scan the module (block 540). For example, the scanner 210 may be arranged to pause or halt the loading process of the module and scan the data inside the module for viruses, malware, etc. At block 542, the scanner 210 determines if malicious data has been detected. If the data in the module has been determined to be harmful to the computer 101, the module is blocked from being loaded (block 544). If the example scanner 210 determines malicious data has not been detected (block 542), it notifies the example open interface 208 to load the module onto the processes (block 546).

At block 532, if the example open interface 208 has not detected a module to be loaded onto processes, the example open interface 208 determines if the user has requested to scan (block 548) the computer 101. For example, the user interface 102 may provide the user an option to request a scanning operation on the computer file system and when the user requests to scan (block 548), the scanner 210 receives the notification and scans all areas of the file system (block 550). For example, in a open OS, applications are not restricted and therefore can have access to kernel components. If the user does not request to scan (block 548), the example open interface 208 detects process activities (block 552) on the computer 101. For example, when a user is performing a plurality of processes known as events, the kernel mode driver or another type of event capture system can provide notifications to the open interface 208 when the kernel mode driver or event capture system detects new processes being executed. When the example open interface 208 receives a notification (block 554) corresponding to a processes activities, it notifies the example scanner 210 to scan the processes (block 556) before they are executed or while they are being executed. If the example open interface 208 does not detect process activities (block 552), the scanning program of the open OS ends.

FIG. 6 is a block diagram of an example processor platform 600 structured to execute the instructions of FIGS. 3, 4, 5A, and 5B to implement the system scanner 106 of FIGS. 1 and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user interface 102, the example applicator 104, the example detector 202, the example adapter 204, the example closed interface 206, the example open interface 208, and the example scanner 210.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3, 4, 5A, and 5B may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that adapt to a computer OS type switch and activate pertinent security engines based on the switch to provide optimal protection of the computer. The disclosed methods, apparatus and articles of manufacture improve the efficiency of using a computing device by providing the scanning services in a set of binaries built form a single source code base that can be utilized for all OS types. By utilizing the same set of binaries, the computer reduces processing time and resources when switching OS types by avoiding the testing and compiling of a new source code after the switch. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   at least one processor circuit to be programmed by the instructions to:
      based on a determination that the at least one processor circuit is controlled by a closed operating system (OS) type, block at least one of a download, a file, a first process, a script, or a module from being at least one of executed, permitted to access user data, launched, executed, or loaded onto a second process, respectively, the at least one of the download, the file, the first process, the script, or the module associated with malicious data; and
      based on detection of a user-initiated switch from the closed OS type to an open OS type, remove, from the at least one memory, at least one of the download, the file, the first process, the script, or the module, wherein the closed OS type provides a user access to applications created by a closed OS application store of a closed OS vendor and the open OS type provides the user access to applications distributed outside an open OS application store of an open OS vendor.

2. The apparatus of claim 1, wherein one or more of the at least one processor circuit is to, based on (a) identifying that the script includes malicious data and (b) determining that the at least one processor circuit is controlled by the closed OS type, block the script from being applied.

3. The apparatus of claim 1, wherein one or more of the at least one processor circuit is to, based on (a) identifying that the file includes malicious data and (b) determining that the at least one processor circuit is controlled by the closed OS type or the open OS type, remove, from the at least one memory, the file.

4. The apparatus of claim 1, wherein one or more of the at least one processor circuit is to:
   based on (a) identifying that the first process includes malicious data and (b) determining that the at least one processor circuit is controlled by the closed-OS type, block the first process from being launched; and
   based on (a) identifying that the first process includes malicious data and (b) determining that the at least one processor circuit is controlled by the open OS type, remove, from the at least one memory, the first process.

5. The apparatus of claim 1, wherein one or more of the at least one processor circuit is to implement an anti-virus scanner to scan at least one file for malicious data.

6. The apparatus of claim 1, wherein one or more of the at least one processor circuit is to implement an anti-spyware scanner to scan data obtained from a network.

7. The apparatus of claim 1, wherein one or more of the at least one processor circuit is to, based on (a) identifying that the module includes malicious data and (b) determining that the at least one processor circuit is controlled by the closed OS type, block the module from being loaded onto the second process.

8. A non-transitory computer readable storage medium comprising instructions that cause one or more processor circuits to at least:
  based on a determination that the one or more processor circuits is controlled by a closed operating system (OS) type, block at least one of a download, a file, a first process, a script, or a module from being at least one of executed, permitted to access user data, launched, executed, or loaded onto a second process, respectively, the at least one of the download, the file, the first process, the script, or the module associated with malicious data; and
  based on detection of a switch from the closed OS type to an open OS type, remove, from at least one memory, at least one of the download, the file, the first process, the script, or the module, wherein the closed OS type provides a user access to applications created by a closed OS application store of a closed OS vendor and the open OS type provides the user access to applications distributed outside an open OS application store of an open OS vendor.

9. The non-transitory computer readable storage medium of claim 8, wherein the instructions cause at least one of the one or more processor circuits to, based on (a) identifying that the script includes malicious data and (b) determining that the one or more processor circuits is controlled by the closed OS type, block the script from being applied.

10. The non-transitory computer readable storage medium of claim 8, wherein the instructions cause at least one of the one or more processor circuits to, based on (a) identifying that the file includes malicious data and (b) determining that the one or more processor circuits is controlled by the closed OS type or the open OS type, remove, from the at least one memory, the file.

11. The non-transitory computer readable storage medium of claim 8, wherein the instructions cause at least one of the one or more processor circuits to:
  based on (a) identifying that the first process includes malicious data and (b) determining that the one or more processor circuits is controlled by the closed OS type, block the first process from being launched; and
  based on (a) identifying that the first process includes malicious data and (b) based on the detection of the switch from the closed OS type to the open OS type, remove, from the at least one memory, the first process.

12. The non-transitory computer readable storage medium of claim 8, wherein the instructions cause at least one of the one or more processor circuits to implement an anti-virus scanner to scan at least one file for malicious data.

13. The non-transitory computer readable storage medium of claim 8, wherein the instructions cause at least one of the one or more processor circuits to implement an anti-spyware scanner to scan data obtained from a network.

14. The non-transitory computer readable storage medium of claim 8, wherein the instructions cause at least one of the one or more processor circuits to, based on (a) identifying that the module includes malicious data and (b) determining that the one or more processor circuits is controlled by the closed OS type, block the module from being loaded onto the second process.

15. An apparatus comprising:
  detector circuitry to detect whether at least one processor circuit is controlled by a closed operating system (OS) type or an open OS type, wherein the closed OS type provides a user access to applications created by a closed OS application store of a closed OS vendor and the open OS type provides the user access to applications distributed outside an open OS application store of an open OS vendor; and
  scanning circuitry to:
    based on a first detection, via the detector circuitry, that the at least one processor circuit is controlled by the closed OS type, block at least one of a download, a file, a first process, a script, or a module from being at least one of executed, permitted to access user data, launched, executed, or loaded onto a second process, respectively, the at least one of the download, the file, the first process, the script, or the module associated with malicious data; and
    based on a second detection, via the detector circuitry, that the at least one processor circuit is controlled by the open OS type, remove, from at least one memory, at least one of the download, the file, the first process, the script, or the module.

16. The apparatus of claim 15, wherein the scanning circuitry is to, based on (a) identifying that the script includes malicious data and (b) the first detection that the at least one processor circuit is controlled by the closed OS type, block the script from being applied.

17. The apparatus of claim 15, wherein the scanning circuitry is to, based on (a) identifying that the file includes malicious data and (b) the first detection that the at least one processor circuit is controlled by the closed OS type or the second detection that the at least one processor circuit is controlled by the open OS type, remove, from the at least one memory, the file.

18. The apparatus of claim 15, the scanning circuitry is to:
  based on (a) identifying that the first process includes malicious data and (b) the first detection that the at least one processor circuit is controlled by the closed OS type, block the first process from being launched; and
  based on (a) identifying that the first process includes the malicious data and (b) the second detection that the at least one processor circuit is controlled by the open OS type, remove, from the at least one memory, the first process.

19. The apparatus of claim 15, further including:
  an anti-virus scanning engine to scan at least one file for malicious data; and
  an anti-spyware engine to scan data obtained from a network.

20. The apparatus of claim 15, the scanning circuitry is to, based on (a) identifying that the module includes malicious data and (b) the first detection that the at least one processor circuit is controlled by the closed OS type, block the module from being loaded onto the second process.

* * * * *